United States Patent Office 3,218,705
Patented Nov. 23, 1965

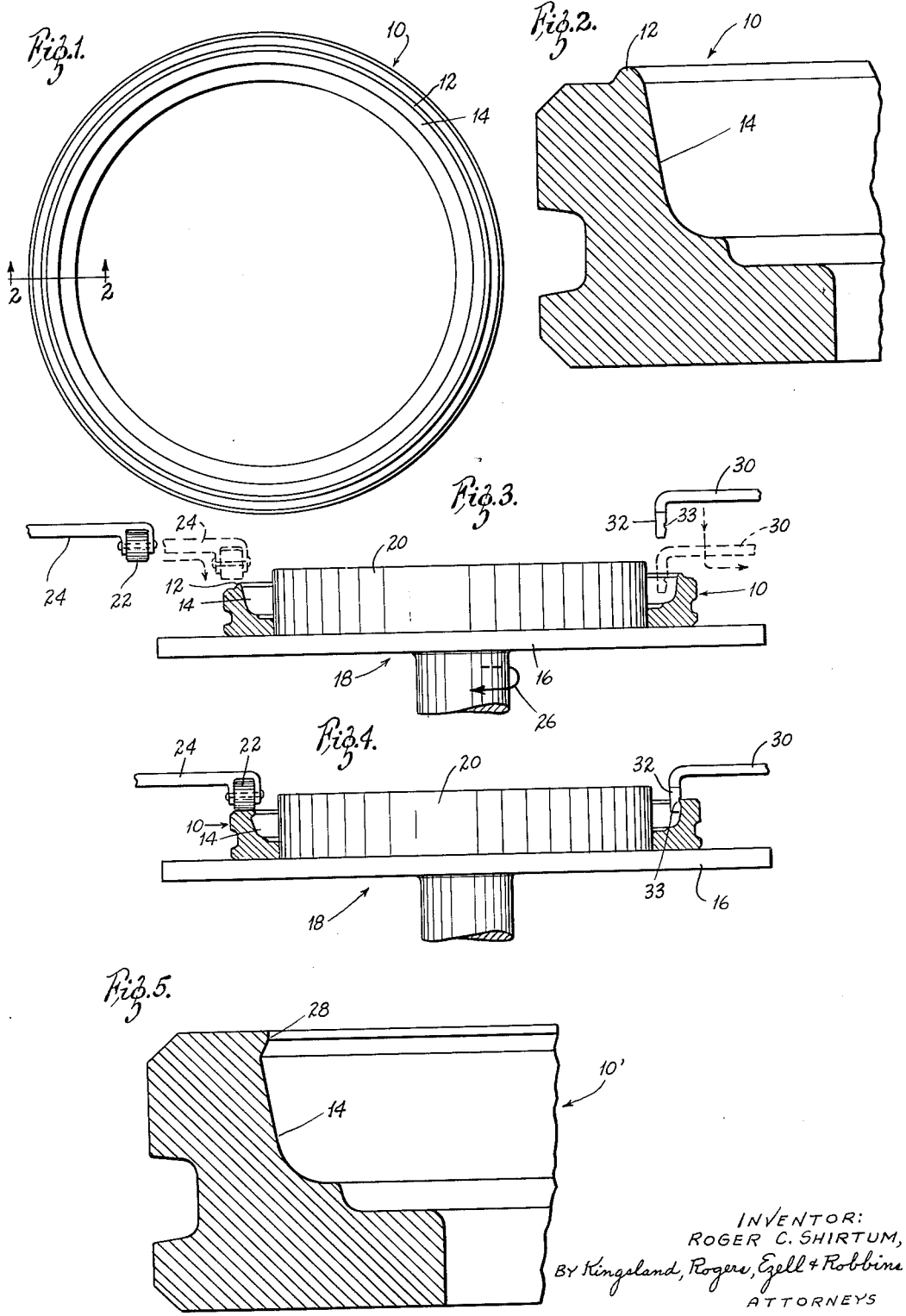

3,218,705
METHOD OF MAKING A SEAL RETAINER, OR THE LIKE
Roger C. Shirtum, Webster Groves, Mo., assignor to St. Louis Diecasting Corporation, St. Louis, Mo., a corporation of Missouri
Filed Nov. 29, 1961, Ser. No. 155,572
5 Claims. (Cl. 29—528)

The present invention relates generally to the art of making items of predetermined form from aluminum, or other metals which may be similarly formed and worked, and more particularly a novel method of making a seal retainer, or the like, from aluminum, or the like.

There has long existed the problem of providing a retainer for O-ring seals, or the like, which will perform the functions of heavy, expensive retainers which have been employed to hold O-rings, or the like, for many years, which will be light in weight, yet rugged, and inexpensive. For example, in the Caterpillar tractor field, heavy steel retainers for O-rings have been employed for years. It is expensive to machine and otherwise work these heavy steel retainers. In addition, the relatively great weight of these items in the large sizes makes them difficult to handle.

Therefore, an object of the present invention is to provide a novel method of making a seal retainer which overcomes the many disadvantages in the long used heavy steel seal retainer.

In brief, the present novel method of providing a seal retainer contemplates casting a seal retainer of a predetermined form of aluminum. The cast retainer has an annular internal surface of predetermined roughness or micro-finish, as cast. A bead of an annular form is cold-rolled into an annular internal lip which is cut to a desired configuration, or cross section. The casting is then finished in respect to rough areas in the usual manner.

Therefore, another object is to provide a novel method of forming a seal retainer, or the like, by means of which a seal retainer can be produced at a small fraction of the cost of presently used seal retainers.

Another object is to provide a novel method of forming a seal retainer, or the like, which incorporates bodily movement of a predetermined portion of an aluminum casting to provide a desired cross section.

Another object is to provide a novel method of making a seal retainer, or the like, by die-casting the article of aluminum, or the like, and subsequently re-forming predetermined portions of the casting to provide a seal retainer of the desired cross section.

The foregoing and other objects and advantages are apparent from the description taken with the accompanying drawing, in which:

FIGURE 1 is a plan view of an aluminum die-cast seal retainer as initially formed, which is to be worked in accordance with the teachings of the present invention;

FIGURE 2 is an enlarged vertical radial cross-sectional view taken on substantially the line 2—2 of FIGURE 1;

FIGURE 3 is a diagrammatic side elevational view of a portion of a machine, the seal retainer of FIGURE 1 being disposed in operative relation therewith, and illustrated in vertical diametric cross section;

FIGURE 4 is a view similar to FIGURE 3, but with certain parts in moved positions; and FIGURE 5 is an enlarged cross-sectional view similar to FIGURE 2, but through a seal retainer of finished cross section.

Referring to the drawing by reference numerals, 10 indicates generally a die-cast aluminum seal retainer as initially formed, which is annular and of a cross section clearly shown in FIGURE 2. The reference numeral 10' is used in respect to FIGURE 5 to indicate the die-cast retainer in its finished form.

The die-casting 10 includes an annular bead 12 and an annular internal tapered surface 14. The tapered surface 14 has a 150 plus or minus 50 microinch finish, as cast, which provides a satisfactory surface preventing slippage of an O-ring disposed thereagainst. The die from which the retainer 10 is cast has an annular surface complementary to the surface 14 which is sand-blasted prior to use to a 150 plus or minus 50 microinch finish.

The die-casting 10 is placed upon a rotatable table 16 forming part of a machine 18, only pertinent fragmentary portions being disclosed. Secured to or formed integral with the table 16 is an annular block 20 about which the die-casting 10 snugly fits. The machine 18 includes a wheel 22 rotatably mounted in the end of an arm 24. The wheel 22 is automatically moved from the position of FIGURE 3 to the position of FIGURE 4 as the table 16 rotates, indicated by the arrow 26 in FIGURE 3. The small wheel 22 applies a pressure in the neighborhood of 600 pounds per square inch to the bead 12, gradually flattening it into a lip 28 (FIG. 5). Cold flow of the aluminum is effected in a matter of three to four seconds. Under this gradual, though fast, deformation caused by the roller 22, as described and shown, there is no splitting of the metal. As the roller 22 completes its job, a second arm 30 of the machine 18 automatically moves a knife 32 secured to the end thereof and having a notch-shaped blade 33 of predetermined form into operative position against the lip 28. The blade 33 trims the lip 28 to the configuration as shown in FIGURE 5, thereby insuring uniformity. The lip 28 provides an abutment for an O-ring disposed in the worked die-casting 10'.

The finished seal retainer 10' replaces the long used, heavy, expensive steel seal retainer. The present novel method of providing the seal retainer 10' by making and working an aluminum die-casting is highly effective for mass production of the particular item desired, hence, each item produced costs a small fraction of the cost of a comparable steel unit.

It is manifest there has been provided a novel method as aforesaid, which fulfills the objects and advantages sought therefor.

It is to be understood that the foregoing description and the accompanying drawing have been given by way of illustration and example. It is also to be understood that changes in and substitution of equivalent steps and changes in sequences of steps which will be obvious to those skilled in the art, are contemplated as within the scope of the present invention which is limited only by the claims which follow.

What is claimed is:

1. A method of forming an annular retainer of aluminum, or the like, having an interior diameter greater than diameters to each side thereof adapted for disposition on a shaft comprising die-casting a retainer having a maximum internal diameter at one side and an annular axially directed bead adjacent thereto, applying a pressure against the bead moving the material thereof radially inwardly decreasing said internal diameter at the opening, providing an interior diameter greater than the lip diameter, and trimming said modified portion to true the form thereof.

2. A method of forming an annular retainer of aluminum, or the like, having an interior diameter greater than diameters to each side thereof adapted for disposition on a shaft comprising die-casting a retainer having a maximum internal diameter at one side and an annular axially directed bead adjacent thereto, applying a pressure against the bead by cold-rolling the material thereof radially inwardly decreasing said internal diameter at the opening, thus providing an interior diameter than the lip diameter, and trimming said modified portion to true the form thereof.

3. A method of forming an annular retainer of aluminum, or the like, having an interior diameter greater than diameters to each side thereof adapted for disposition on a shaft comprising die-casting a retainer having a maximum internal diameter at one side and an annular axially directed bead adjacent thereto, applying a pressure against the bead bodily moving the material thereof radially inwardly and axially into said retainer decreasing said internal diameter at the opening, providing an interior diameter greater than the lip diameter, and trimming said modified portion to true the form thereof.

4. A method of forming a ring-like retainer of aluminum, or the like, to a predetermined cross-section comprising die-casting the retainer in initial form to include an annular bead on one side adjacent the inner edge, applying pressure to the outer portion of annular bead gradually moving it radially inwardly and into the interior of the ring to provide a lip of smaller diameter than that of the inner surface adjacent thereto and trimming said modified portion to true the form thereof.

5. A method of forming an annular retainer of aluminum, or the like, having an interior diameter greater than diameters to each side thereof adapted for disposition on a shaft comprising die-casting a retainer having a maximum internal diameter at one side and an annular axially directed bead adjacent thereto, and applying a pressure against the bead by cold-rolling the material thereof radially inwardly thus decreasing said internal diameter at the opening and providing an interior diameter greater than the lip diameter and trimming said modified portion to true the form thereof.

References Cited by the Examiner

UNITED STATES PATENTS

| | | |
|---|---|---|
| 1,489,013 | 4/1924 | Schatz. |
| 1,908,171 | 5/1933 | Naugle et al. _____ 29—528 |
| 2,323,972 | 7/1943 | Brauchler _____ 29—528 |
| 2,427,072 | 9/1947 | Rubin _____ 29—148.4 |
| 2,797,945 | 7/1957 | Monahan _____ 277—188 |
| 2,898,134 | 8/1959 | Moskow _____ 277—188 |
| 3,066,557 | 12/1962 | Stevens _____ 29—556 X |

FOREIGN PATENTS 694,905    7/1953    Great Britain.

JOHN F. CAMPBELL, *Primary Examiner.*

SAMUEL B. ROTHBERG, WHITMORE A. WILTZ,
*Examiners.*